(12) United States Patent
Häll et al.

(10) Patent No.: US 11,400,501 B2
(45) Date of Patent: Aug. 2, 2022

(54) TUBULAR ELEMENT AND ASSEMBLIES

(71) Applicant: AB SANDVIK MATERIALS TECHNOLOGY, Sandviken (SE)

(72) Inventors: Henrik Häll, Sandviken (SE); Olle Eriksson, Årsunda (SE)

(73) Assignee: AB Sandvik Materials Technology, Sandviken (SE)

( * ) Notice: Subject to any disclaimer, the term of this patent is extended or adjusted under 35 U.S.C. 154(b) by 24 days.

(21) Appl. No.: 17/056,667

(22) PCT Filed: May 13, 2019

(86) PCT No.: PCT/EP2019/062173
§ 371 (c)(1),
(2) Date: Nov. 18, 2020

(87) PCT Pub. No.: WO2019/224031
PCT Pub. Date: Nov. 28, 2019

(65) Prior Publication Data
US 2021/0197242 A1 Jul. 1, 2021

(30) Foreign Application Priority Data
May 22, 2018 (EP) .................................. 18173640

(51) Int. Cl.
*F16L 13/007* (2006.01)
*B21C 37/15* (2006.01)
(Continued)

(52) U.S. Cl.
CPC ............ *B21C 37/154* (2013.01); *F16L 5/022* (2013.01); *F16L 13/007* (2013.01);
(Continued)

(58) Field of Classification Search
CPC .. B21C 37/154; F16L 13/007; F16L 13/0209; F16L 41/084; F16L 41/086; F16L 9/22;
(Continued)

(56) References Cited

U.S. PATENT DOCUMENTS

| 81,305 A | * | 8/1868 | Smith | ................... F16L 41/084 |
|----------|---|--------|-------|---------|
|  |  |  |  | 285/201 |
| 2,788,994 A |  | 4/1957 | Van De Wateren |  |

(Continued)

FOREIGN PATENT DOCUMENTS

| CH | 299791 A | * | 6/1954 |
| DE | 2710176 B1 |  | 6/1978 |

(Continued)

OTHER PUBLICATIONS

International Search Report and Written Opinion dated Aug. 5, 2019, issued in corresponding International Patent Application No. PCT/EP2019/062173.

*Primary Examiner* — Zachary T Dragicevich
*Assistant Examiner* — James A Linford
(74) *Attorney, Agent, or Firm* — Morgan, Lewis & Bockius LLP

(57) ABSTRACT

Herein a tubular element (2) is disclosed. The tubular element comprises a first tubular portion (4) comprising a first metal or alloy and a second tubular portion (6) comprising a second metal or alloy. At least a portion of an interface (9) between the first and second tubular portions (4, 6) extends within a fixed diameter range along a longitudinal direction (L) of the tubular element. The second tubular portion (6) comprises a first end portion (8) arranged around the first tubular portion (4). The second tubular portion (6) comprises a sealing surface (10) extending circumferentially around the second tubular portion (6) at the first end portion (8).

20 Claims, 4 Drawing Sheets

(51) Int. Cl.
    *F16L 13/02*         (2006.01)
    *F16L 41/08*         (2006.01)
    *F16L 5/02*          (2006.01)

(52) U.S. Cl.
    CPC ......... *F16L 13/0209* (2013.01); *F16L 41/084* (2013.01); *F16L 41/086* (2013.01)

(58) Field of Classification Search
    CPC ......... F16L 41/082; F16L 41/12; F16L 41/14; F16L 5/022
    See application file for complete search history.

(56) References Cited

U.S. PATENT DOCUMENTS

| | | |
|---|---|---|
| 3,140,108 A | 7/1964 | Klein et al. |
| 3,208,776 A | 9/1965 | Buschow |
| 4,187,955 A | 2/1980 | Dörling |
| 4,454,977 A * | 6/1984 | Aldinger ................ B23K 20/00 228/175 |
| 2009/0065083 A1 * | 3/2009 | Mei ....................... E21B 17/003 138/155 |

FOREIGN PATENT DOCUMENTS

| | | | |
|---|---|---|---|
| FR | 0021912 A1 * | 1/1981 | |
| GB | 1258141 A | 12/1971 | |
| WO | 2018/115501 A1 | 6/2018 | |

* cited by examiner

TUBULAR ELEMENT AND ASSEMBLIES

TECHNICAL FIELD

The present disclosure relates to a tubular element. The present disclosure further relates to tubular assemblies. Further the present disclosure relates to an assembly comprising a wall member and a tubular element.

BACKGROUND

Tubular elements are utilised in innumerable different applications. It may be difficult to join two metallic tubes made of different materials. Moreover, arranging a tube to extend through a wall may pose its particular problems.

GB1258141 discloses a method for joining two tubes of different alloys that are difficult to join by welding. According to this method, a connection tube is produced that has a first end portion of a first alloy, compatible with the alloy of one of the tubes, and a second end portion of a second alloy, compatible with the alloy of the other one of the tubes. Between the end portions, there is a middle portion in which the first alloy forms an outer layer and the second alloy forms an annular inner layer. A metallic bond has been formed between the layers by means of hot extrusion.

Production of the connection tube disclosed in GB1258141 involves forming a composite tube that has an annular outer layer of the first alloy and an annular inner layer of the second alloy. For making the composite tube, two tubular components are provided, wherein one of the components is inserted into the other component to form a billet. Longitudinal splines are used to provide a mechanical interlock between the components. The billet is enclosed in a toroidal metal case forming a vacuum tight seal around the billet. The vacuum tight seal facilitates formation of a metallic bond during subsequent extrusion together with the case such that a composite tube is formed. The diameter of a first end portion of the composite tube is reduced, such that a portion with a gradually decreasing diameter is formed between the first end portion and a middle portion of the composite tube. The annular inner layer is thereafter removed from the first end portion and the annular outer layer is removed from the second end portion. Thus, a connection tube with consistent inner and outer diameters is provided. Two tubes of different materials can be welded to the respective end portions of the connection tube.

A similar tube comprising two different materials is disclosed in U.S. Pat. No. 3,140,108. Metallurgically bonded joints between zirconium or high-zirconium alloys and ferrous metal are disclosed. A method and a resulting product of joining such predominantly-zirconium metal to stainless steel in the form of rods, tubes, and the like is discussed.

U.S. Pat. No. 3,208,776 discloses a tubular coupling consisting of two dissimilar metallic nipples which permit field welding of dissimilar pipes which are not normally weldable together. Molten aluminium is used for forming an aluminium nipple around part of a stainless steel nipple. The tubular coupling is used for interconnecting pipes used in e.g. cryogenic service. The tubular coupling is welded at one end to an aluminium pipe and at its other end to a stainless steel pipe. The tubular coupling is devoid of flanges and is welded to the relevant pipes via welding scarves provided at the respective ends of the tubular coupling.

In certain industrial applications, an inside of a structural component for storing and/or transporting fluid or gaseous medium, such as e.g. a container or a pipe, may be subjected to tough conditions. For instance, a high temperature may prevail in the structural component, and/or corrosive fluid or gaseous medium may be stored in or pass through the structural component. Thus, the structural component suitably is manufactured from a material which is able to withstand the relevant tough conditions. Such a material often is costly. Accordingly, an alternative may be to provide the structural component with a double layered wall. That is, a load-bearing outer part of the structural component is manufactured from a first cheaper material and provided with a liner or cladding of a second material, which is able to withstand the tough conditions inside the structural component.

Providing a gas and/or fluid tight tubular connection through e.g. such a double layered wall of a structural element may be complicated. Fluid or gaseous medium should not be allowed to leak in between the double layered wall and the tubular connection. The portion of the tubular connection arranged on an inside of the structural element has to withstand the tough conditions inside the structural element. Joining different types of materials by welding may be complicated, or even impossible, etc.

SUMMARY

It would be advantageous to achieve a tubular element overcoming, or at least alleviating, at least some of the above-mentioned drawbacks. In particular, it would be desirable to provide a tubular element, which is compatible with two different materials (e.g. different metals or metal alloys). Moreover, it would be desirable to provide a tubular element suitable for providing a tubular connector through a double layered wall comprising two different materials (e.g. metals or metal alloys), which two materials are difficult to join by welding. To better address one or more of these concerns, a tubular element having the features defined in one of the independent claims is provided.

According to an aspect of the present disclosure, this is achieved by a tubular element comprising a first tubular portion comprising a first metal or alloy and a second tubular portion comprising a second metal or alloy, the first and second tubular portions, extending along a longitudinal direction. The first tubular portion has a first length. The first tubular portion extends inside the second tubular portion along a first portion of the first length and outside the second tubular portion along a second portion of the first length. An interface between the first tubular portion and the second tubular portion comprises a metallic bond and a mechanical interlocking and at least a portion of the interface extends within a fixed diameter range along the longitudinal direction, wherein the second tubular portion comprises a first end portion arranged around the first tubular portion, and wherein the second tubular portion comprises a sealing surface extending circumferentially around the second tubular portion at the first end portion.

Since at least a portion of the interface extends within a fixed diameter range along the longitudinal direction, since the second tubular portion comprises a first end portion arranged around the first tubular portion, and since the second tubular portion comprises a sealing surface extending circumferentially around the second tubular portion at the first end portion, the tubular element is configured to be arranged with the second tubular portion comprising the second metal or alloy and the sealing surface against the same or similar metal or alloy, while the first tubular portion comprising the first metal or alloy is provided for connecting the tubular element to a further tube.

More specifically, the tubular element is configured to extend through a wall member with the sealing surface at the second tubular portion abutting against a portion of the wall member formed of a material with similar properties, and/or of the same material type, and/or of the same material as the second metal or alloy. Thus, both the wall member and the tubular element, with the second tubular portion adjoining the portion of the wall member, are arranged to withstand conditions to the same degree. For instance, under high temperature conditions the second metal or alloy is selected to be a material which withstands high temperatures. Accordingly, also the material of the portion of the wall member at the second tubular portion withstands high temperatures. Hence, an assembly comprising the tubular element and the wall member, which assembly withstands high temperature conditions may be provided.

The longitudinal direction extends along the extension of the tubular element. The longitudinal direction may extend in parallel with a centre axis of the tubular element. The tubular element may have a suitable cross section, such as circular, oval, square, rectangular, etc.

The first metal or alloy is a different metal or alloy then the second metal or alloy. The first metal or alloy may not be weldable with the second metal or alloy. The metallic bond of the interface means that the interface is diffuse, i.e. the interface forms a transitional zone in a radial direction of the tubular element. No clear interface line may be detected between the first and second tubular portions. The mechanical interlocking of the interface may for instance comprise threads, or remnants of threads having been altered during the manufacturing of the tubular element.

The fixed diameter range of the interface entails that at least along the portion of the interface, the interface extends substantially in parallel with the longitudinal direction, i.e. in parallel with the longitudinal direction bound within the diameter range. This is in contrast with the angled interfaces of the prior art tubes disclosed in GB1258141 and U.S. Pat. No. 3,140,108.

The sealing surface extending circumferentially around the second tubular portion at the first end portion means that the sealing surface is provided around the entire tubular element, at the second tubular portion. The sealing surface is configured for abutment against a corresponding similarly shaped surface, e.g. a surface around a hole extending through a wall member. The sealing surface may for instance have an annular shape. Suitably, the sealing surface is configured to provide at least a certain degree of sealing between a space adjacent to the second tubular portion and the first tubular portion, when the sealing surface abuts against a corresponding surface. For instance, the sealing surface may have a surface finish sufficient to provide at least a certain degree of sealing when abutting against a corresponding surface.

According to embodiments, the second tubular portion may comprise a circumferentially extending shoulder or flange at the first end portion, and wherein the sealing surface may be formed at least partially by the shoulder or flange. In this manner, a portion of the tubular element may be configured to provide the sealing surface. A shoulder may be formed by a recess in the second tubular portion. A flange may be formed by a protrusion from the second tubular portion.

According to embodiments, the second tubular portion may comprise an alignment portion at the first end portion. The alignment portion may extend from a first end of the second tubular portion at the first end portion towards the sealing surface. In this manner, a portion of the tubular element, the alignment portion, may be utilised for positioning the tubular element inside a through hole e.g. a wall member, while the sealing surface abuts against a portion of the wall member. The alignment portion may abut against an inner surface portion of the through hole.

According to embodiments, at least part of the alignment portion may comprise a threaded outer portion. In this manner, the tubular element may be not only aligned, but also at least partially secured to a structure comprising corresponding inner threads.

According to embodiments, the interface may extend along the longitudinal direction over substantially the entire first portion of the first length. The portion of the interface extending within a fixed diameter range along the longitudinal direction may have a length along the longitudinal direction of at least 0.5 times the first portion of the first length. In this manner, the interface may be provided over a substantial length of an overlap between the first and second tubular portions. Thus, the first tubular portion may be secured in relation to the second tubular portion in an efficient way.

According to embodiments, a second end portion of the first tubular portion may be provided with outer threads. In this manner, the tubular element may be connected to a conduit via the threaded second end portion of the first tubular portion. For instance, a further tube may be connected at the second end portion.

According to embodiments, the tubular element may comprise a connection member provided with inner threads configured to engage with the outer threads of the first tubular portion. In this manner, e.g. a threaded nut, or a threaded flange may be provided as the connection member.

According to embodiments, the second metal or metal alloy may be selected from a ferritic iron chromium aluminium (FeCrAl) alloy. In this manner, a tubular element, at the end where the second tubular portion is arranged, may comprise a material that forms aluminium oxide on the surface. Thus, that end of the tubular element may be adapted to withstand severe corrosive environments.

According to embodiments, the first metal or metal alloy may be selected from a stainless steel alloy, a nickel-based alloy, zirconium or a zirconium alloy, aluminium or an aluminium alloy, copper or a copper alloy, or titanium or a titanium alloy.

According to embodiments, the interface between the first tubular portion and the second tubular portion is formed by hot working, such as by extrusion. In this manner, the first and second tubular portions may be joined via an interface providing a metallic bond.

To better address one or more of the above discussed concerns, tubular assemblies having the features defined in one of the independent claims is provided.

Thus, according to a further aspect of the present disclosure, this is achieved by a tubular assembly comprising a tubular element according to any one of aspects and/or embodiments discussed herein and a tube made of a same metal or alloy as the second tubular portion, wherein the tube is welded to the second tubular portion, or arranged in threaded engagement with the second tubular portion.

In this manner, a tubular assembly comprising mainly the second metal or alloy is provided, and thus, having the inherent properties of the second metal or alloy such as e.g. heat resistance, while the tubular assembly benefits at one end thereof of the properties of the first metal or alloy of the first tubular portion such as e.g. being weldable.

According to an even further aspect of the present disclosure, this is achieved by a tubular assembly comprising a tubular element according to any one of aspects and/or embodiments discussed herein and a tube made of a same metal or alloy as the first tubular portion, wherein the tube is welded to the first tubular portion, or arranged in threaded engagement with the first tubular portion.

In this manner, a tubular assembly comprising mainly the first metal or alloy is provided, and thus, having the inherent properties of the first metal or alloy such as e.g. good pressure resistance at low cost, while the tubular assembly benefits at one end thereof of the properties of the second metal or alloy of the second tubular portion such as e.g. heat resistance.

To better address one or more of above discussed concerns, an assembly comprising a wall member and a tubular element having the features defined in one of the independent claims is provided.

Thus, according to an additional aspect of the present disclosure, this is achieved by an assembly comprising a wall member and a tubular element according to any one of aspects and/or embodiments discussed herein. The wall member comprises a first layer made from a first material and a second layer made from a second material, wherein a through hole extends through the wall member, and wherein the tubular element extends through the through hole with the sealing surface at the second tubular portion abutting against the second layer.

In this manner, an assembly is provided with the tubular element extending through the wall member with the sealing surface at the second tubular portion abutting against a portion of the wall member.

Suitably, the sealing surface may be configured to provide at least a certain degree of sealing against the second layer of the wall member. Thus, the through hole may be sealed from a space adjacent to the second layer of the wall member.

Suitably, the tubular element may extend through the wall member with the sealing surface at the second tubular portion abutting against a portion of the wall member formed of a material with similar properties, and/or of the same material type, and/or of the same material as the second metal or alloy. That is, suitably the second layer of the wall member comprises a material with similar properties, and/or of the same material type, and/or more of the same material as the second metal or alloy. Thus, both the wall member and the tubular element, with the second tubular portion adjoining the second layer of the wall member, may be arranged to withstand conditions in a space adjacent to the second layer to the same extent.

For instance, under high temperature conditions the second metal or alloy is selected to be a material which withstands high temperatures. Accordingly, also the material of the second layer of the wall member withstands high temperatures. Hence, the assembly may withstand high temperature conditions.

According to embodiments, the first tubular portion may be fastened against the first layer of the wall member. In this manner, the tubular element may be secured to the wall member. Since the sealing surface abuts against the second layer of the wall member, such fastening against the first layer of the wall member may secure the tubular element to the wall member.

Fastening of the first tubular portion against the first layer may be achieved in a number of different ways. For instance, the first tubular portion may be welded to the first layer, a connection member provided with inner threads may engage with outer threads of the first tubular portion and abuts against the first layer, just to mention two examples.

According to embodiments, wherein the second tubular portion comprises an alignment portion at the first end portion, as discussed above, the alignment portion may abut against at least one of the first and second layers, inside the through hole. In this manner, the tubular element may be aligned in the through hole of the wall member.

According to embodiments, wherein at least part of the alignment portion comprises a threaded outer portion, the wall member in the through hole may be at least partially provided with inner threads and the threaded outer portion of the alignment portion may engage with the inner threads. In this manner, the tubular element may be both aligned in the through hole of the wall member, and at least partially secured to the wall member.

According to embodiments, the second material of the second layer may be the same material as the second metal or alloy of the second tubular portion. In this manner, the tubular element and the wall member on the side of the second layer may be configured to withstand particular conditions. Since the second tubular portion and the second layer are the same metal or alloy both are devised to withstand the same kind of conditions Further features of, and advantages with, the present disclosure will become apparent when studying the appended claims and the following detailed description.

BRIEF DESCRIPTION OF THE DRAWINGS

Various aspects and/or embodiments of the present disclosure, including its particular features and advantages, will be readily understood from the example embodiments discussed in the following detailed description and the accompanying drawings, in which.

DETAILED DESCRIPTION

Aspects and/or embodiments of the present disclosure will now be described more fully. Like numbers refer to like elements throughout. Well-known functions or constructions will not necessarily be described in detail for brevity and/or clarity.

Figure 1:
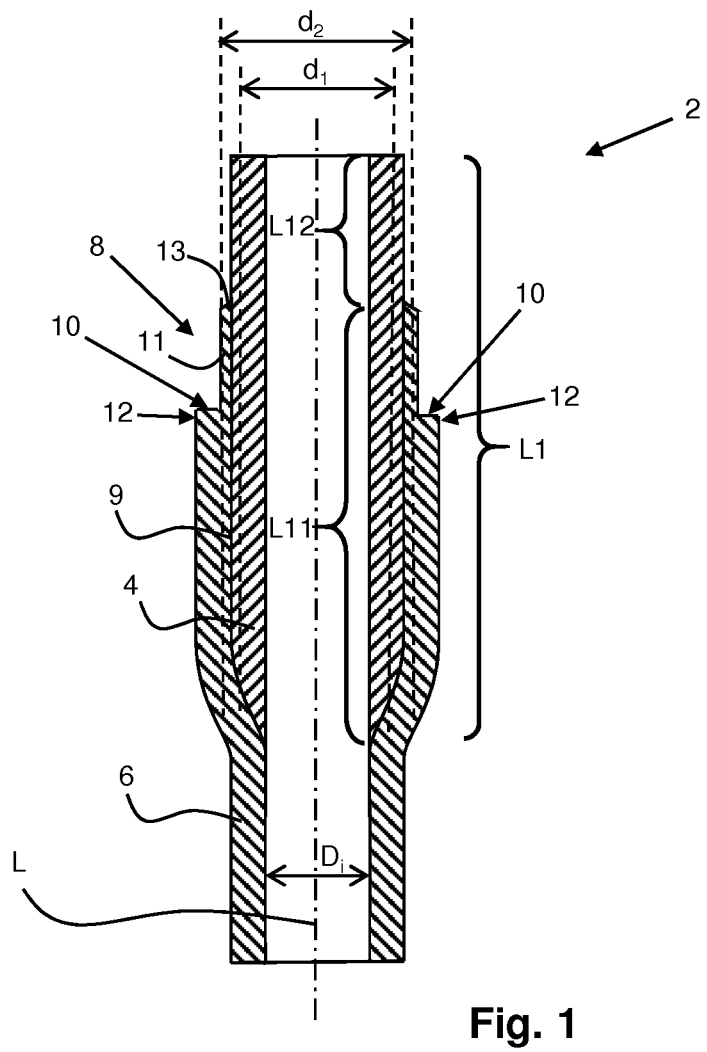
FIG. 1 illustrates a cross section through a tubular element according to embodiments.
Figure 2:
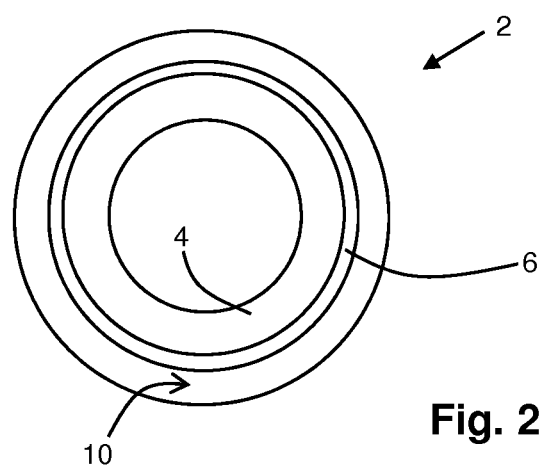
FIG. 2 illustrates an end view of the tubular element.

FIG. 1 illustrates a cross section through a tubular element 2 according to embodiments. FIG. 2 illustrates an end view of the tubular element 2.

The tubular element 2 comprises a first tubular portion 4 and a second tubular portion 6. The tubular element 2, the first tubular portion 4, and that the second tubular portion 6 extend along a longitudinal direction L. The longitudinal direction L may extend in parallel with a centre axis of the tubular element 2.

The first tubular portion 4 has a first length L1. That is, the first tubular portion 4 has a length L1. The first tubular portion 4 extends inside the second tubular portion 6 along a first portion L11 of the first length L1. The first tubular portion 4 extends outside the second tubular portion 6 along a second portion L12 of the first length L1. This means that first length L1 is made up of the first portion L11 and the second portion L12.

The first tubular portion 4 comprises a first metal or alloy. The second tubular portion 6 comprises a second metal or alloy. The first metal or alloy is a different metal or alloy than the second metal or alloy. The first metal or alloy cannot be joined with the second metal or alloy by welding.

An interface 9 between the first tubular portion 4 and the second tubular portion 6 comprises a metallic bond and a mechanical interlocking. The interface 9 extends substantially along the entire first portion L11 of the first length L1. The interface 9 between the first tubular portion 4 and the second tubular portion 6 is formed by hot working. Suitably, such hot working may be in the form of extrusion. In FIG. 1, the interface 9 is shown as an even line. In practice, the interface 9 is more uneven and may be e.g. serrated. Moreover, the interface 9 is diffuse, as discussed above.

Mentioned as an example, the tubular element 2 may be manufactured in a process comprising:
Providing a first blank made of the first metal or alloy with outer threads and providing a second blank made of the second metal or alloy with inner threads.
Screwing the first blank at least partially into the second blank.
Extruding of the thus joined first and second blanks through a die to form a composite tube joined via an interface comprising the metallic bond and the mechanical interlocking. While the threads of the first and second blanks may have been deformed during the extrusion, the remnants of the threads still provide the mechanical interlocking between the first and second tubular portions 4, 6.
Machining the composite tube at both ends to provide the first portion L11 of the first tubular portion 4 inside the second tubular portion 6 and the second portion L12 of the first tubular portion 4 outside the second tubular portion 6.

The threaded engagement between the first and second blanks may provide for the metallic bond between the first and second tubular portions due to the threads preventing air/oxygen from penetrating into the joint between the two blanks, which form the first and second tubular portions during the extrusion.

At least a portion of the interface 9 extends within a fixed diameter range along the longitudinal direction L. That is, at least a portion of the interface 9 extends in parallel with the longitudinal direction L. Put differently, the fixed diameter range forms an imaginary cylindrical shell extending in parallel with the longitudinal direction L, and the portion of the interface 9 extends within this imaginary cylindrical shell. In FIG. 1 broken lines indicate the inner diameter d1 and the outer diameter d2 of the fixed diameter range. Both the metallic bond and the mechanical interlocking are arranged with in the fixed diameter range.

As shown in FIG. 1, the interface 9 may extend along the longitudinal direction L over substantially the entire first portion L11 of the first length L1.

The portion of the interface 9 extending within the fixed diameter range along the longitudinal direction L may have a length along the longitudinal direction L of at least 0.5 times the length of the first portion L11. In FIG. 1 the portion of the interface 9 extending within the fixed diameter range is clearly visible. Namely, the portion of the interface 9 extending within the fixed diameter range ends at that longitudinal position, where the interface 9 crosses the broken line indicating the inner diameters d1 of the interface 9.

The interface 9 has a gradually reduced diameter towards the inner diameter $D_i$ of the tubular element 2.

The second tubular portion 6 comprises a first end portion 8 arranged around the first tubular portion 4. The second tubular portion 6 comprises a sealing surface 10 extending circumferentially around the second tubular portion 6 at the first end portion 8. Put differently, at the first end portion 8, the second tubular portion 6 is provided with a sealing surface 10.

Since the tubular element 2 comprises the first tubular portion 4 comprising the first metal or alloy and the second tubular portion 6 comprising the second metal or alloy, the tubular element 2 is suitable for providing a tubular connector through wall member comprising at least two layers comprising two different materials. One layer of the wall member comprises is material of the same kind, or the same material, as the second metal or alloy, and the sealing surface 10 of the second tubular portion and 6 abuts against said one layer. See further below with reference to FIGS. 3 and 4.

The tubular element 2 may have a substantially constant inner diameter $D_i$ along the longitudinal direction L.

Mentioned purely as an example, the tubular element 2 may have a length along the longitudinal direction L within a range of 100-400 mm, an inner diameter $D_i$ within a range of 20-60 mm, and radial wall thickness at the second portion L12 of the first tubular portion 2 within a range of 2-10 mm.

The main purpose with the sealing surface 10 is to provide a surface which is configured to abut against a different surface, such as a surface around a hole provided in a wall member. Thus, the sealing surface 10 forms a natural stop as the tubular element 2 is inserted into the through hole. In these embodiments, the sealing surface 10 extends at a 90° angle to the longitudinal direction L. According to non-limiting alternative embodiments, the sealing surface 10 may extend at an angle within a range of 90-15 degrees, or within a range of 90-30 degrees, or within a range of 90-40 degrees to the longitudinal direction L.

In these embodiments, the second tubular portion 6 comprises a circumferentially extending shoulder 12 at its first end portion 8. The sealing surface 10 is formed at least partially by the shoulder 12. The shoulder 12 is formed in a recess in the second tubular portion 6.

The second tubular portion 6 comprises an alignment portion 11 at the first end portion 8. The alignment portion 11 extends from a first end 13 of the second tubular portion 6 at the first end portion 8 towards the sealing surface 10. The alignment portion 11 may be utilised for positioning the tubular element 2 inside a through hole of e.g. a wall member.

In these embodiments the alignment portion 11 has an even substantially cylindrical surface. According to alternative embodiments, the alignment portion may be frustoconical with a small diameter end at the first end 13 of the second tubular portion 6 and a large diameter end towards the sealing surface 10. According to a further alternative, the alignment portion 11 may be provided with threads, see further below with reference to FIG. 3.

The second tubular portion 6 of the tubular element 2 is configured to withstand particularly tough conditions, such as heat and/or corrosive fluids. According to embodiments, the second metal or metal alloy may be selected from a ferritic iron-chromium-aluminium (FeCrAl) alloy.

Some non-limiting examples of the second metal alloy of the second tubular portion are discussed in the following.

In an embodiment of the present disclosure the ferritic FeCrAl-alloy of the second tubular portion comprises, in wt-%: Cr 9 to 25; Al 3 to 7; Mo 0 to 5; C 0 to 0.08; Si 0 to 3.0; Mn 0 to 0.5; balance Fe; and normally occurring impurities.

The term "impurities" as referred to herein is intended to denote substances that will contaminate the FeCrAl-alloy when it is industrially produced, due to the raw materials such as ores and scraps, and due to various other factors in the production process, and are allowed to contaminate within the ranges not adversely affecting the ferritic FeCrAl-alloy as defined hereinabove or hereinafter.

In a further embodiment of the present disclosure, the content of Mo, C, Si, and Mn is larger than 0 wt-%.

In yet another embodiment of the present disclosure, the ferritic FeCrAl-alloy comprises, in wt-%: Cr 9 to 25; Al 3 to 7; Mo 0 to 5; Y 0.05 to 0.60; Zr 0.01 to 0.30; Hf 0.05 to 0.50; Ta 0.05 to 0.50; Ti 0 to 0.10; O 0.01 to 0.05; N 0.01 to 0.06; O 0.02 to 0.10; Si 0.10 to 3.0; Mn 0.05 to 0.50; P 0 to 0.80; S 0 to 0.005; balance Fe; and normally occurring impurities. In a further embodiment of the present disclosure, the content of Mo, Ti, P, and S is larger than 0 wt-% in this ferritic FeCrAl-alloy.

In yet another embodiment of the present disclosure, the ferritic FeCrAl-alloy comprises in wt-%: Cr 15-25; Al 3-7; Mo 0-5; Y 0.05-0.60; Zr 0.01-0.30; Hf 0.05-0.50; Ta 0.05-0.50; O 0.01-0.05; Ti 0-0.10; N 0.01-0.06; O 0.02-0.10: Si 0.10-0.70; Mn 0.05-0.50; P 0-0.8; S 0-0.05; balance Fe; and normally occurring impurities.

In the above embodiments, the compositions of the FeCrAl-alloy may further comprise additional elements or substances in concentrations, wherein these elements or substances do not change the specific properties of the FeCrAl-alloy as outlined in the present disclosure. In this case the term "balance Fe" denotes the balance to 100% in addition to mandatory elements according to the embodiments plus optional elements or substances.

In an embodiment, the ferritic FeCrAl-alloy of the second tubular portion consists of, in wt-%: Cr 9 to 25; Al 3 to 7; Mo 0 to 5; C 0 to 0.08; Si 0 to 3.0; Mn 0 to 0.5; balance Fe; and normally occurring impurities.

In yet another embodiment of the present disclosure, the ferritic FeCrAl-alloy consists of, in wt-%: Cr 9 to 25; Al 3 to 7; Mo 0 to 5; Y 0.05 to 0.60; Zr 0.01 to 0.30; Hf 0.05 to 0.50; Ta 0.05 to 0.50; Ti 0 to 0.10; O 0.01 to 0.05; N 0.01 to 0.06; O 0.02 to 0.10; Si 0.10 to 3.0; Mn 0.05 to 0.50; P 0 to 0.80; S 0 to 0.005; balance Fe; and normally occurring impurities.

In yet another embodiment of the present disclosure, the ferritic FeCrAl-alloy consists of in wt-%: Cr 15-25; Al 3-7; Mo 0-5; Y 0.05-0.60; Zr 0.01-0.30; Hf 0.05-0.50; Ta 0.05-0.50; O 0.01-0.05; Ti 0-0.10; N 0.01-0.06; O 0.02-0.10: Si 0.10-0.70; Mn 0.05-0.50; P 0-0.8; S 0-0.05; balance Fe; and normally occurring impurities.

Alloys falling into anyone of the above specifications are characterized by an extraordinary heat resistance, form stability as well as resistance against corrosion.

The first tubular portion of the tubular element 2 may be made from a number of different materials. The first metal or alloy may be a material, which is e.g. easily weldable, can be easily machined, and/or withstands high pressure.

Figure 3:
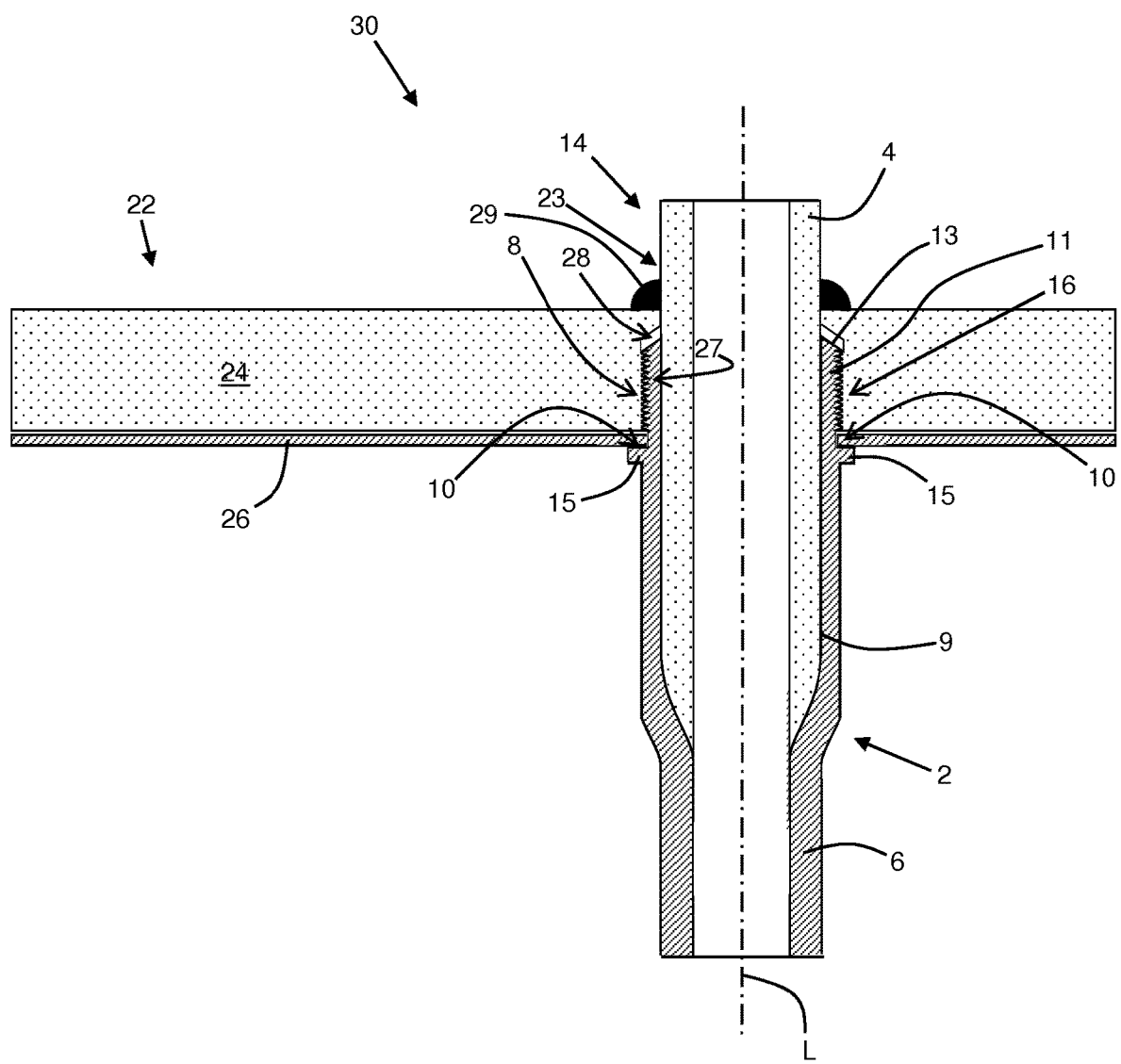
FIGS. 3 and 4 illustrate cross sections through assemblies according to embodiments.

FIG. 3 illustrates a cross section through an assembly 30 according to embodiments. The assembly 30 comprises a wall member 22 and a tubular element 2.

The tubular element 2 resembles in much the tubular element 2 discussed in connection with the embodiments of FIGS. 1 and 2. Mainly, the differing features of the tubular element 2 will be discussed in the following.

Again, the tubular element 2 comprises a first tubular portion 4 comprising a first metal or alloy and a second tubular portion 6 comprising a second metal or alloy. The tubular element 2 extends along a longitudinal direction L.

An interface 9 between the first tubular portion 4 and the second tubular portion 6 comprises a metallic bond and a mechanical interlocking.

Again, the second tubular portion 6 comprises a sealing surface 10 extending circumferentially around the second tubular portion 6 at a first end portion 8 of the second tubular portion 6.

In these embodiments, the second tubular portion 6 comprises a circumferentially extending flange 15 at the first end portion 8. The sealing surface 10 is formed at least partially by the flange 15.

Again, the second tubular portion 6 comprises an alignment portion 11 at the first end portion 8. The alignment portion 11 extends from a first end 13 of the second tubular portion 6 at the first end portion 8 towards the sealing surface 10.

In these embodiments, at least part of the alignment portion 11 comprises a threaded outer portion 16. Thus, the tubular element 2 may be threaded into corresponding inner threads 27 of the wall member 22, see further below.

In these embodiments, a second end portion 14 of the first tubular portion 4 is provided with an even outer surface 23.

As mentioned above, the assembly 30 comprises the wall member 22 and the tubular element 2. The tubular element 2 may be a tubular element 2 according to any one of aspects and/or embodiments discussed herein. The wall member 22 may form part of a wall of e.g. a container or a larger diameter pipe.

The wall member 22 comprises a first layer 24 made from a first material and a second layer 26 made from a second material. A through hole 28 extends through the wall member 22. The tubular element 2 extends through the through hole 28 with the sealing surface 10 at the second tubular portion 6 abutting against the second layer 26.

The sealing surface 10 extending circumferentially around the second tubular portion 6 at the first end portion 8 means that the sealing surface 10 is provided around the entire tubular element 2, at the second tubular portion 6. Around the through hole 28, the second layer 26 comprises a surface portion configured for abutment against the sealing surface 10.

The second tubular portion 2 comprises an alignment portion 11 at the first end portion 8, as discussed above. The alignment portion 11 abuts against at least one of the first and second layers 24, 26, inside the through hole 28. The alignment portion 11 comprises the threaded outer portion 16 and the wall member 22 inside the through hole 28 is at least partially provided with inner threads 27. The threaded outer portion 16 of the alignment portion 11 engages with the inner threads 27.

The first tubular portion 4 is fastened against the first layer 24 of the wall member 22. In these embodiments, the first tubular portion 4 is fastened with a weld 29 against the first layer 24 of the wall member 22. Thus, the tubular element 2 is secured to the wall member 22 by the weld 29. More specifically, the second end portion 14 of the first tubular portion 4 is welded at part of its even outer surface 23 against the first layer 24 of the wall member 22.

In the embodiments illustrated in FIG. 3, comprising the alignment portion 11 of the second tubular portion 6 provided with a threaded outer portion 16, the tubular element 2 is screwed into the inner threads 27 provided in the wall member 22 inside the through hole 28 until the sealing surface 10 abuts against the second layer 26 of the wall member 22. This provides an initial securing of the tubular element 2 to the wall member 22, and a sealing between the sealing surface 10 and the second layer 26, at least to a certain extent. Thereafter, the weld 29 is provided to fasten the first tubular portion 4 against the first layer 24 of the wall member 22.

As mentioned above, the second material, i.e. the material of the second layer 26 may be a material of the same kind or a material having same or similar properties as the second metal or alloy, or the material of the second layer 26 may be the same material as the second metal or alloy.

According to some embodiments, the first material, i.e. the material of the first layer 24 may be a material of the same kind or a material having same or similar properties as the first metal or alloy, or the material of the first layer 24 may be the same material as the first metal or alloy. In these embodiments, the first material of the first layer 24 and the first metal and or alloy of the first tubular portion 4 are at least compatible from a welding perspective. However, different requirements on the tubular element 2 and the wall member 22, may according to some embodiments require different materials with different properties in the first layer 24 and the first tubular portion 4.

Figure 4:
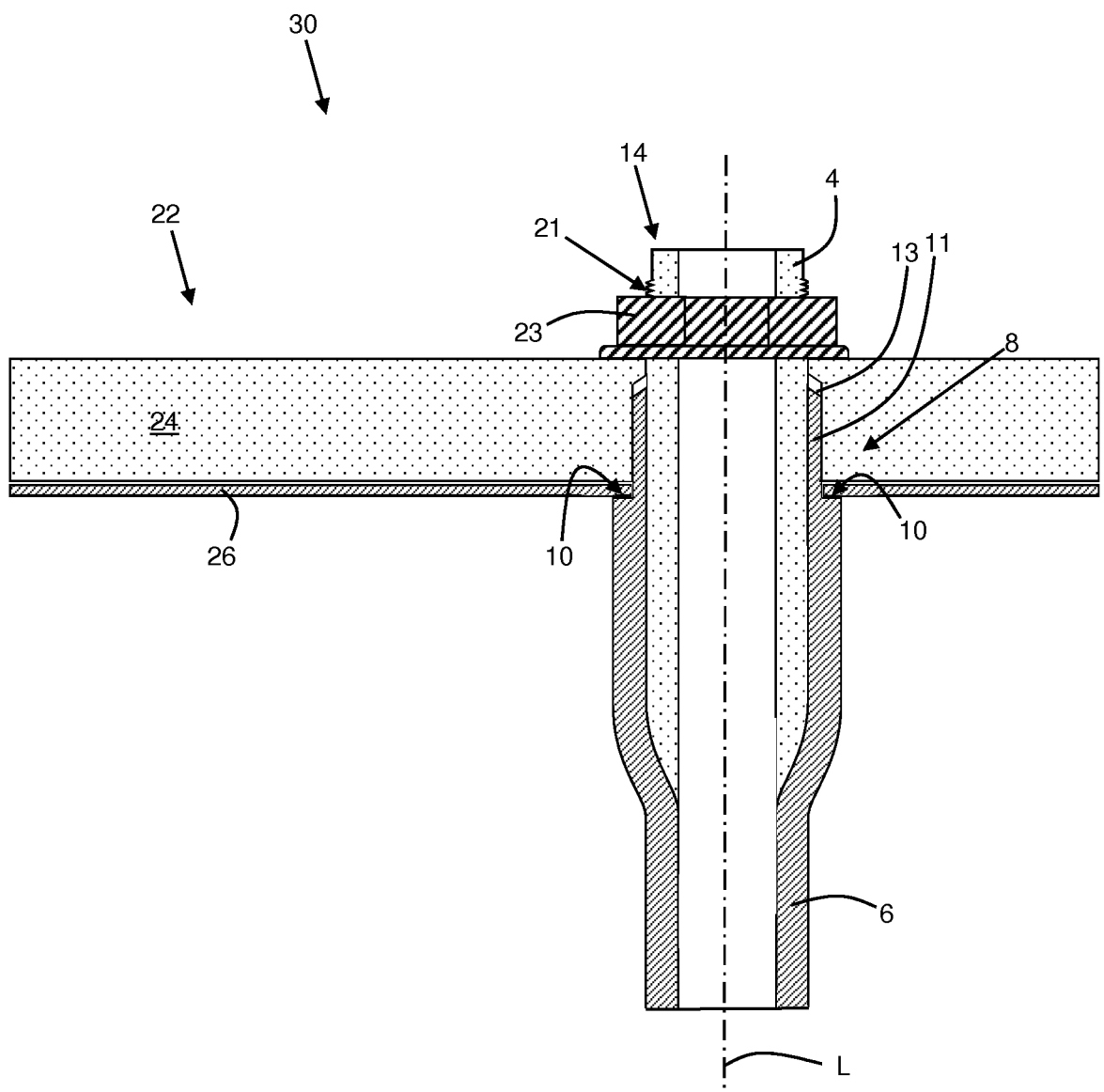

FIG. 4 illustrates a cross section through an assembly 30 according to embodiments. Again, the assembly 30 comprises a wall member 22 and a tubular element 2.

The tubular element 2 resembles in much the tubular elements 2 discussed in connection with the embodiments of FIGS. 1-3. Mainly, the differing features of the tubular element 2 will be discussed in the following.

Also, the assembly 30 resembles in much the assembly 30 discussed in connection with the embodiments of FIG. 3. Mainly the differing features of the assembly 30 will be discussed in the following.

Again, the tubular element 2 comprises a first tubular portion 4 comprising a first metal or alloy and a second tubular portion 6 comprising a second metal or alloy. The tubular element 2 extends along a longitudinal direction L. An interface 9 between the first tubular portion 4 and the second tubular portion 6 comprises a metallic bond and a mechanical interlocking.

Again, the second tubular portion 6 comprises a sealing surface 10 extending circumferentially around the second tubular portion 6 at a first end portion 8 of the second tubular portion 6.

Again, the second tubular portion 6 comprises an alignment portion 11 at the first end portion 8. The alignment portion 11 extends from a first end 13 of the second tubular portion 6 at the first end portion 8 towards the sealing surface 10.

In these embodiments, a second end portion 14 of the first tubular portion 4 is provided with outer threads 21.

The tubular element 2 comprises a connection member 23 provided with inner threads configured to engage with the outer threads 21 of the first tubular portion 4. In FIG. 4 the connection member 23 has been exemplified with a threaded nut. Various other connection members may alternatively be used, such as e.g. a threaded flange, a threaded coupling, etc.

The outer threads 21 may alternatively, or additionally, be utilised for connecting a further tube or conduit to the tubular element 2.

As mentioned above, the assembly 30 comprises the wall member 22 and the tubular element 2. Again, the wall member 22 comprises a first layer 24 made from a first material and a second layer 26 made from a second material. A through hole 28 extends through the wall member 22. The tubular element 2 extends through the through hole 28 with the sealing surface 10 at the second tubular portion 6 abutting against the second layer 26.

Again, the second tubular portion 2 comprises an alignment portion 11 at the first end portion 8. In these embodiments, the alignment portion 11 has an even cylindrical shape. The alignment portion 11 abuts against at least one of the first and second layers 24, 26, inside the through hole 28.

The first tubular portion 4 is fastened against the first layer 24 of the wall member 22. In these embodiments, wherein the assembly 30 comprises a tubular element 2 with a first tubular portion 4 provided with outer threads 21, the first tubular portion 4 is fastened against the first layer 24 of the wall member 22 with the connection member 23 provided with inner threads engaging with the outer threads 21 of the first tubular portion 4. Thus, the tubular element 2 is secured to the wall member 22 by the connection member 23.

In the embodiments illustrated in FIG. 4, the tubular element 2 may be inserted into the through hole 28 until the sealing surface 10 abuts against the second layer 26 of the wall member 22. This provides an initial positioning of the tubular element 2 in relation to the wall member 22. Thereafter, the connection member 23 is screwed onto the first tubular portion 4 to fasten the first tubular portion 4 against the first layer 24 of the wall member 22 thus, securing the tubular element 2 to the wall member 22, and a sealing between the sealing surface 10 and the second layer 26, at least to a certain extent.

According to some embodiments, the connection member 23 may be welded to the first layer 24 of the wall member 22 and/or to the second end portion 14 of the first tubular portion 4. Thus, additional fastening of the first tubular portion 4 against the first layer 24 may be provided, and the connection member 23 may be prevented from loosening.

Figure 5:
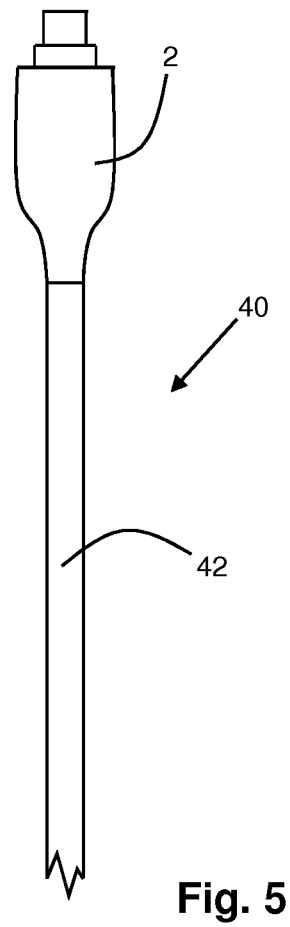
FIGS. 5 and 6 illustrate tubular assemblies according to embodiments.

FIG. 5 illustrates a tubular assembly 40 according to embodiments. The tubular assembly 40 comprises a tubular element 2 according to any one of aspects and/or embodiments discussed herein and a tube 42 made of a same metal or alloy as the second tubular portion 6. That is, the tube 42 is made of the second metal or alloy. The tube 42 made of the same metal or alloy as the second tubular portion 6 is welded to the second tubular portion 6, or arranged in threaded engagement with the second tubular portion 6.

This tubular assembly 40 may be attached to a structure, such as a wall member discussed above in connection with FIGS. 3 and 4, utilising the tubular element 2. However, the tubular assembly 40 mainly comprises the second metal or alloy and thus, has the inherent properties of the second metal or alloy such as e.g. heat resistance.

Figure 6:
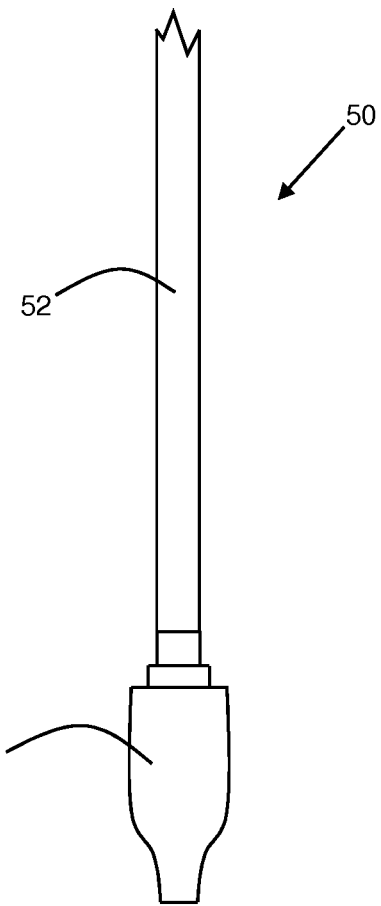

FIG. 6 illustrates a tubular assembly 50 according to embodiments. The tubular assembly 50 comprises a tubular element 2 according to any one of aspects and/or embodiments discussed herein and a tube 52 made of a same metal or alloy as the first tubular portion 4. That is, the tube 52 is made of the first metal or alloy. The tube 52 made of the same metal or alloy as the first tubular portion 4 is welded to the first tubular portion 4, or arranged in threaded engagement with the first tubular portion 4.

In this manner, a tubular assembly 50 comprising mainly the first metal or alloy is provided, and thus, having the inherent properties of the first metal or alloy such as e.g. good pressure resistance at low cost, while the tubular assembly 50 benefits at one end thereof of the properties of the second metal or alloy of the second tubular portion 6.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims. For instance, the tubular element 2 may be secured by means of a connection member 23 to the wall member 22 in the embodiments illustrated in FIG. 3, and the tubular element 2 in the embodiments illustrated in FIG. 4 may be secured to the wall member 22 by a weld between the first tubular portion 4 and the first layer 22.

The invention claimed is:

1. A tubular element, comprising:
a first tubular portion comprising a first metal or alloy and a second tubular portion comprising a second metal or alloy, the first and second tubular portions extending along a longitudinal direction,
wherein the first tubular portion has a first length,
wherein the first tubular portion extends inside the second tubular portion along a first portion of the first length and outside the second tubular portion along a second portion of the first length,
wherein an interface between the first tubular portion and the second tubular portion comprises a metallic bond and a mechanical interlocking,
wherein at least a portion of the interface extends within a fixed diameter range along the longitudinal direction,
wherein the second tubular portion comprises a first end portion arranged around the first tubular portion,
wherein the second tubular portion comprises a sealing surface extending circumferentially around the second tubular portion at the first end portion,
wherein the second tubular portion comprises an alignment portion at the first end portion, and
wherein the alignment portion extends from a first end of the second tubular portion at the first end portion towards the sealing surface.

2. The tubular element according to claim 1, wherein the second tubular portion comprises a circumferentially extending shoulder or flange at the first end portion, and wherein the sealing surface is formed at least partially by the shoulder or flange.

3. The tubular element according to claim 1, wherein at least part of the alignment portion comprises a threaded outer portion.

4. The tubular element according to claim 1, wherein a second end portion of the first tubular portion is provided with outer threads.

5. The tubular element according to claim 4, comprising a connection member provided with inner threads configured to engage with the outer threads of the first tubular portion.

6. The tubular element according to claim 1, wherein a second end portion of the first tubular portion is provided with an even outer surface.

7. The tubular element according to claim 1, wherein the second metal or metal alloy is selected from a ferritic iron chromium aluminium (FeCrAl) alloy.

8. The tubular element according to claim 1, wherein the interface between the first tubular portion and the second tubular portion is formed by hot working.

9. The tubular element according to claim 1, wherein the interface between the first tubular portion and the second tubular portion is formed by extrusion.

10. The tubular element according to claim 1, wherein the interface between the first tubular portion and the second tubular portion is formed by extrusion.

11. A tubular assembly, comprising:
a tubular element according to claim 1, and
a tube made of a same metal or metal alloy as the second tubular portion,
wherein the tube is welded to the second tubular portion or is arranged in threaded engagement with the second tubular portion.

12. An assembly, comprising:
a wall member and a tubular element according to claim 1,
wherein the wall member comprises a first layer made from a first material and a second layer made from a second material,
wherein a through hole extends through the wall member, and
wherein the tubular element extends through the through hole with the sealing surface at the second tubular portion abutting against the second layer.

13. The assembly according to claim 12, wherein the first tubular portion is fastened against the first layer of the wall member.

14. The assembly according to claim 13, wherein the first tubular portion is fastened with a weld against the first layer of the wall member.

15. An assembly, comprising:
a wall member and a tubular element according to claim 6,
wherein the wall member comprises a first layer made from a first material and a second layer made from a second material,
wherein a through hole extends through the wall member,
wherein the tubular element extends through the through hole with the sealing surface at the second tubular portion abutting against the second layer, and
wherein the first tubular portion is fastened against the first layer of the wall member with the connection member provided with inner threads engaging with the outer threads of the first tubular portion.

16. An assembly, comprising:
a wall member and a tubular element according to claim 1,
wherein the wall member comprises a first layer made from a first material and a second layer made from a second material,
wherein a through hole extends through the wall member,
wherein the tubular element extends through the through hole with the sealing surface at the second tubular portion abutting against the second layer, and
wherein the alignment portion abuts against at least one of the first and second layers inside the through hole.

17. An assembly, comprising:
a wall member and a tubular element according to claim 3,
wherein the wall member comprises a first layer made from a first material and a second layer made from a second material,
wherein a through hole extends through the wall member,
wherein the tubular element extends through the through hole with the sealing surface at the second tubular portion abutting against the second layer,
wherein the wall member in the through hole is at least partially provided with inner threads, and
wherein the threaded outer portion of the alignment portion engages with the inner threads.

18. A tubular assembly, comprising:
a tubular element according to claim 1, and
a tube made of a same metal or alloy as the first tubular portion,
wherein the tube is welded to the first tubular portion or is arranged in threaded engagement with the first tubular portion.

19. An assembly, comprising:
a wall member and a tubular element,
wherein the wall member comprises a first layer made from a first material and a second layer made from a second material,
wherein a through hole extends through the wall member,
wherein the tubular element extends through the through hole with the sealing surface at the second tubular portion abutting against the second layer,
wherein the tubular element includes a first tubular portion comprising a first metal or alloy and a second tubular portion comprising a second metal or alloy, the first and second tubular portions extending along a longitudinal direction,
wherein the first tubular portion has a first length,
wherein the first tubular portion extends inside the second tubular portion along a first portion of the first length and outside the second tubular portion along a second portion of the first length,
wherein an interface between the first tubular portion and the second tubular portion comprises a metallic bond and a mechanical interlocking,
wherein at least a portion of the interface extends within a fixed diameter range along the longitudinal direction,
wherein the second tubular portion comprises a first end portion arranged around the first tubular portion, and
wherein the second tubular portion comprises a sealing surface extending circumferentially around the second tubular portion at the first end portion.

20. An assembly, comprising:
a wall member and a tubular element,
wherein the wall member comprises a first layer made from a first material and a second layer made from a second material,
wherein a through hole extends through the wall member,
wherein the tubular element extends through the through hole with the sealing surface at the second tubular portion abutting against the second layer,
wherein the first tubular portion is fastened against the first layer of the wall member with the connection member provided with inner threads engaging with the outer threads of the first tubular portion,
wherein the tubular element includes a first tubular portion comprising a first metal or alloy and a second tubular portion comprising a second metal or alloy, the first and second tubular portions extending along a longitudinal direction,
wherein the first tubular portion has a first length,
wherein the first tubular portion extends inside the second tubular portion along a first portion of the first length and outside the second tubular portion along a second portion of the first length,
wherein an interface between the first tubular portion and the second tubular portion comprises a metallic bond and a mechanical interlocking,
wherein at least a portion of the interface extends within a fixed diameter range along the longitudinal direction,
wherein the second tubular portion comprises a first end portion arranged around the first tubular portion,
wherein the second tubular portion comprises a sealing surface extending circumferentially around the second tubular portion at the first end portion, and
wherein a second end portion of the first tubular portion is provided with an even outer surface.

* * * * *